United States Patent [19]

Snow

[11] Patent Number: 4,825,670

[45] Date of Patent: May 2, 1989

[54] VEHICLE SHIFT AND RADIO SECURITY LOCK DEVICE

[76] Inventor: Michael A. Snow, 21922 Gresham St., West Hills, Calif. 91304

[21] Appl. No.: 83,158

[22] Filed: Aug. 10, 1987

[51] Int. Cl.$^4$ .............................................. E05B 65.12
[52] U.S. Cl. ........................................ 70/238; 70/57; 70/258; 70/166; 70/203; 70/247
[58] Field of Search ..................... 70/57, 58, 158, 160, 70/162, 166–169, 202, 203, 238, 247, 258; 74/572; 180/336, 54.1, 165

[56] References Cited

U.S. PATENT DOCUMENTS

| | | | |
|---|---|---|---|
| 1,453,004 | 4/1923 | Collion | 70/203 |
| 4,028,913 | 6/1977 | Falk | 70/258 X |
| 4,077,276 | 3/1978 | Knox, Jr. | 70/203 X |
| 4,131,173 | 12/1978 | Boersma | 70/160 X |
| 4,248,069 | 2/1981 | Burbank | 70/258 X |
| 4,553,414 | 11/1985 | Caputo et al. | 70/58 |
| 4,693,099 | 9/1987 | Cykman | 70/247 |
| 4,699,238 | 10/1987 | Tamir | 70/238 X |

FOREIGN PATENT DOCUMENTS 2142889  1/1985  United Kingdom ................. 70/247

*Primary Examiner*—Robert L. Wolfe
*Assistant Examiner*—Suzanne L. Dino
*Attorney, Agent, or Firm*—John J. Posta, Jr.

[57] ABSTRACT

The vehicle auto security lock device includes an about upright frame adapted to be permanently connected to the interior of the driver compartment of a vehicle adjacent the vehicle's gear shift and radio, the latter mounted in the dashboard. The frame includes a pair of spaced upright plates positionable on opposite sides of a gear shift console and bridged by a horizontal bar. The inner faces of the plates adjacent their upper ends bear grooves adapted to slideably receive the ends of a u-shaped horizontal hasp extending toward the gear shift. A generally closed box slides down on the plates and seats on the crossbar. The rear end of the box bears a plate which covers the face of the vehicle radio. The box when seated is positioned immediately behind the gear shift lever. The hasp loops around the opposite end of the gear shift lever and in the operative position pins it against the box. The ends of the hasp slide into the front of the box and in the plate grooves. The box bears a key lock the locking plunger of which releasably pins the hasp in the box and preferably locks the box to the frame so that the box cannot be removed, thus preventing theft of the vehicle and removal of the radio.

12 Claims, 2 Drawing Sheets

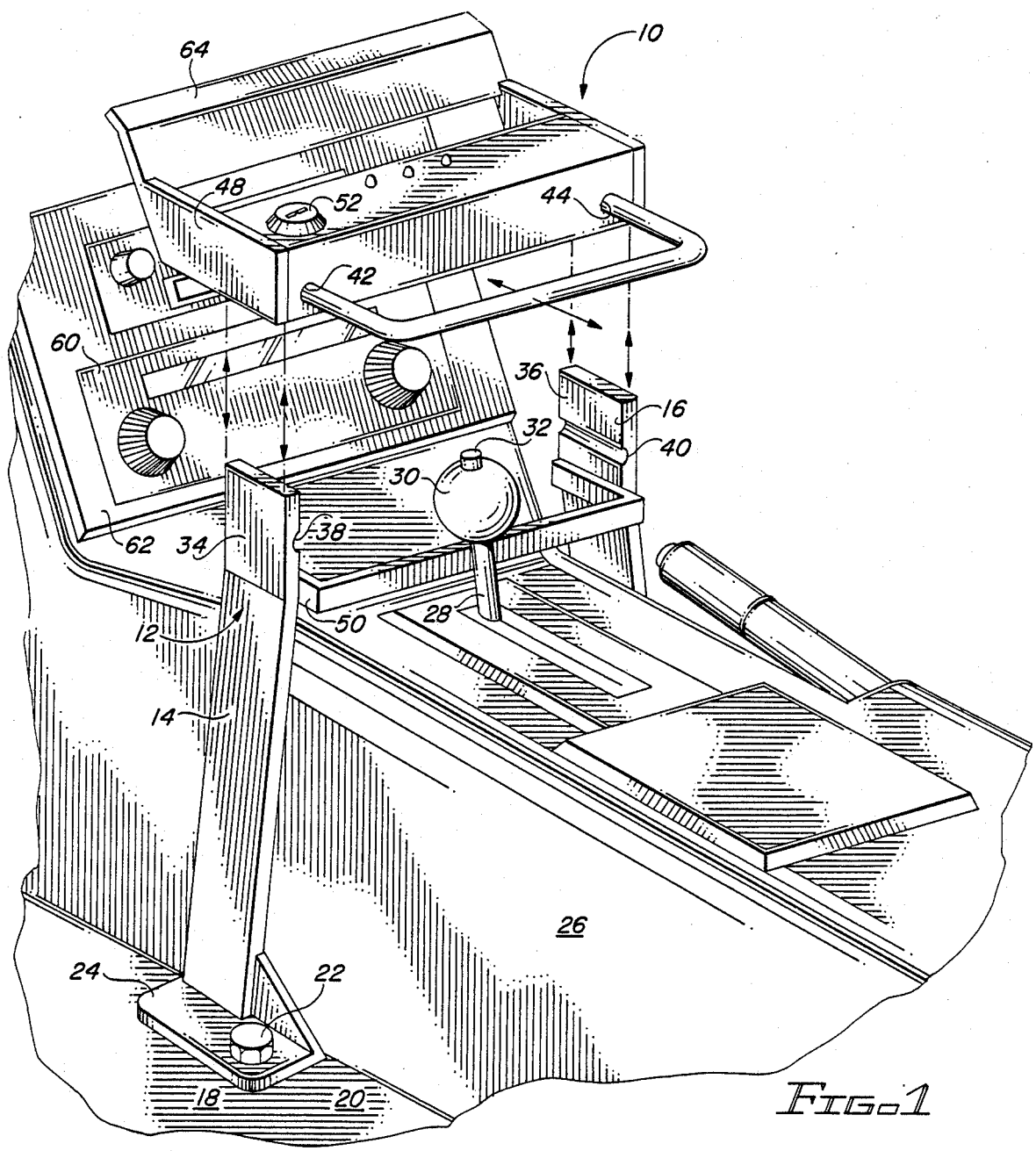
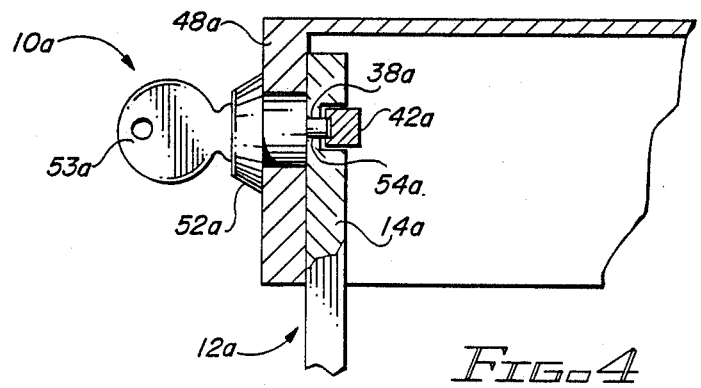

VEHICLE SHIFT AND RADIO SECURITY LOCK DEVICE

BACKGROUND OF THE INVENTION

1. Field of the Invention

The present invention generally relates to security devices and, more particularly, to a security device which simultaneously protects a vehicle radio and prevents gear shifting and theft of the vehicle.

2. Prior Art

Various mechanical and electrical devices have been provided to prevent vehicle theft. These include alarms, steering wheel locks, ignition and door locks and the like. Such locks can, in most cases, be by-passed so that vehicle thefts continue unabated. There is a need for an improved device which can temporarily immobilize a vehicle to prevent its theft.

There is also a need for a device which will prevent a vehicle radio from being stolen. Vehicle radios are the most frequent items removed from pilfered vehicles. U.S. Pat. Nos. 4,028,913 to Falk, 4,248,069 to Burbank & 4,131,171 to Boeroma disclose several such devices, all of which are complicated, require structural modification of the vehicle, typically its dashboard, and are difficult to install. Moreover, none of those devices are capable of immobilizing a vehicle to prevent its theft.

Accordingly, there remains a need for a security device which can simply, inexpensively and effectively protect a vehicle radio against theft and also prevent the theft of the vehicle itself.

SUMMARY OF THE INVENTION

The improved vehicle security device of the present invention satisfies all the foregoing needs. The device is substantially as set forth in the Abstract. Thus, it effectively simultaneously protects the vehicle itself and the vehicle radio against theft.

The device includes an upright frame in the form of a spaced pair of plates or posts, which straddle the gear shift console, preferably with a horizontal cross bar interconnecting the upper portions thereof over the console and acting as a stop or seat for a generally closed box which slides down over the upper ends of the plates to a position immediately behind the console shift lever of a vehicle.

The upper ends of the plates bear horizontal grooves which slideably receive the opposite ends of a u-shaped horizontal hasp, which extends forward thereof around the opposite end of the gear shift lever. The hasp is moveable rearwardly against the shift lever to pin it to the box, thus immobilizing it and preventing the vehicle from being stolen and driven away.

The hasp ends enter the box and pass through the plate grooves when the box is seated thereon. A box lock releasably pins one of the hasp ends in the box, simultaneously locking the hasp in the box and the box to the frame.

The box bears a rear plate or is otherwise configured such that it overlies and blocks the face of the vehicle dashboard radio when the box is seated on the frame, thus preventing removal of the radio. Accordingly, the device simultaneously protects both the radio and the vehicle against theft.

Further features of the present invention are set forth in the following detailed description and accompanying drawings.

DRAWINGS

FIG. 1 is a schematic perspective view of a first preferred embodiment of the improved vehicle gear shift and radio security lock device of the present invention, showing the device with its frame installed around a vehicle gear shift console and with its box disposed above the frame;

DETAILED DESCRIPTION

FIGS. 1-2

Figure 2:
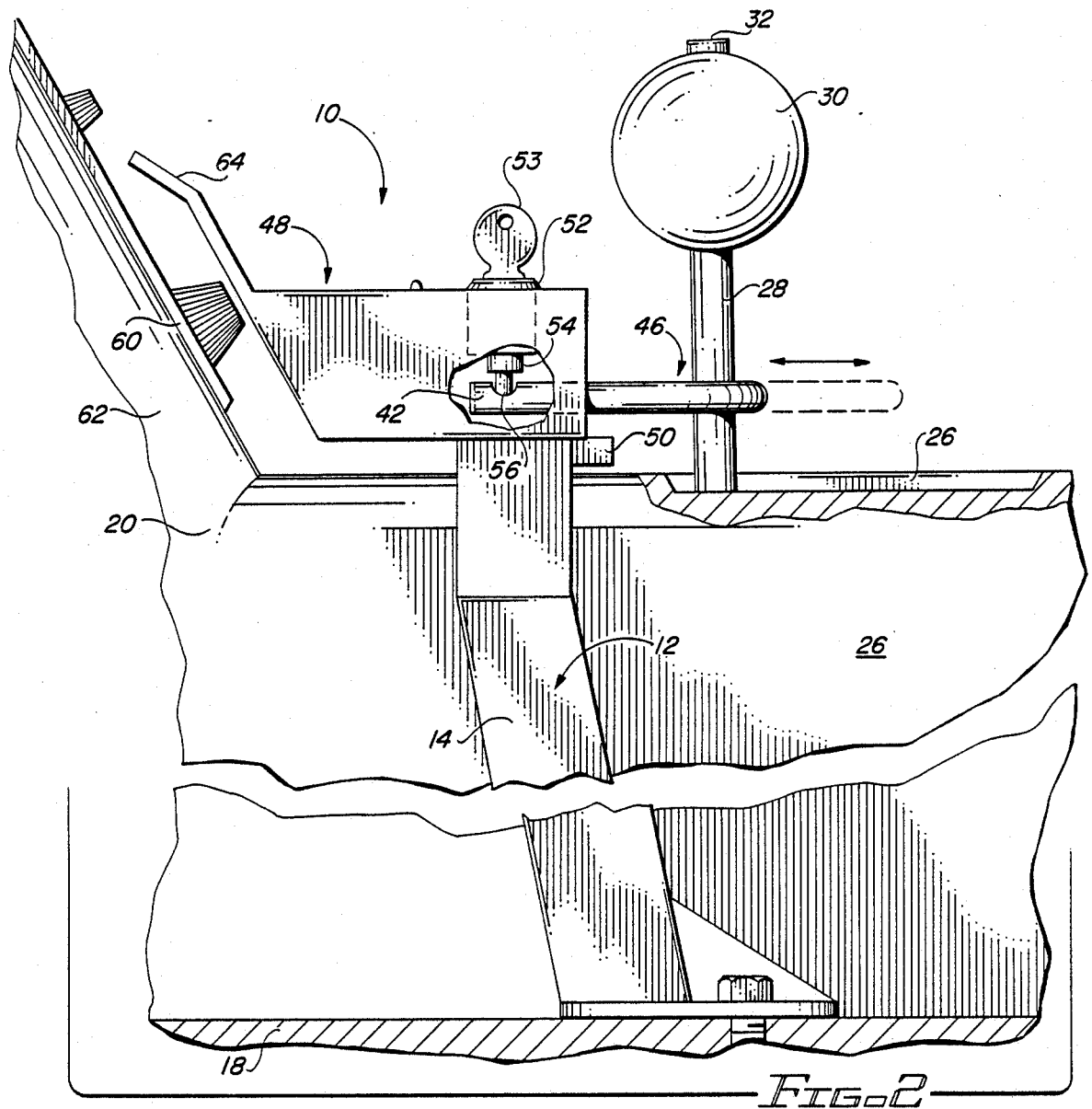
FIG. 2 is a schematic side elevation, partly broken away, of the device of FIG. 1 with the box thereof seated on the frame and with the hasp thereof locked against the vehicle gear shift lever.

Now referring more particularly to FIGS. 1 and 2 of the drawings, a first preferred embodiment of the improved vehicle gear shift and radio security device of the present invention is schematically depicted therein. Thus, device 10 is shown. Device 10 includes a frame 12 in the form of a spaced pair of generally upright plates or posts 14 and 16, preferably permanently secured to the floor 18 of a vehicle 20, as by bolts 22 passing through horizontal feet 24 secured to bottom of plates 14 and 16, on opposite sides of vehicle gear shift console 26 adjacent console gear shift lever 28. Lever 28 has an upper expanded grip knob 30 permanently secured thereto by a bolt 32 or the like.

The upper ends 34 and 36 of plates 14 and 16, respectively, bear horizontal grooves 38 and 40 (FIG. 2) slideably receiving the rear ends 42 and 44 of u-shaped horizontal loop or hasp 46. Ends 34 and 36 fit up into and releasably slideably receive a generally closed box 48 which slides down thereover and seats on a horizontal cross bar 50 interconnecting plates 14 and 16.

In the seated position as shown in FIG. 2, box 48 is immediately behind shift lever 28 and above console 26. Hasp ends 42 and 44 slide rearwardly thereinto. Thus, hasp 46 moves between a forward position entirely or partially out of box 48 and capable of clearing knob 30 when lowered thereover, and the rearward position of FIG. 2 against lever 28, pinning it to box 48 to prevent shifting of lever 28 and driving operation of vehicle 20.

In the rearward position shown in FIG. 2, hasp ends 42 and 44 are in grooves 38 and 40, respectively, while ends 34 and 36 of plates 14 and 16 are in box 48. Box 48 is provided with a lock 52 or the like with a key 53. Lock 52 also includes a locking plunger 54 which intercepts end 42 in groove 38, thus locking hasp 46 to box 48 and box 48 to plate 14 and frame 12 so that box 48 and hasp 46 cannot be removed. For this purpose, end 42 may, if desired, have a plunger-receiving opening or groove 56, as shown in FIG. 2. Preferably, hasp 46 is a steel bar circular cross-section and grooves 38 and 40 are semi-circular.

In addition to the gear shift-locking function of device 10, as described above, device 10 simultaneously has a radio theft prevention function. Thus, the rear end 64 of box 48 is configured as to effectively cover and overlie the face of vehicle dashboard radio 60 when box 48 is in the operative position of FIG. 2, thus effectively preventing the removal and theft of radio 60 from dashboard 62. In this regard, box 48 has a upwardly and rearwardly projecting radio cover plate 64 connected to the rear end thereof for this purpose.

Device 10 is utilized by first installing frame 12 in vehicle 20. Then, when it is desired to leave vehicle 20 and protect it and radio 60 from theft, lock 52 is unlocked by key 53, and hasp 46 is pulled forward until it will clear knob 30. That is, have its front in the dotted position shown in FIG. 2 and in the solid position of FIG. 1. Box 48 is then lowered over ends 34 and 36 until seated on cross bar 50 (the position shown in FIG. 2). Thereafter, hasp 46 is moved rearwardly to the solid position shown in FIG. 2, so that ends 42 and 44 thereof slide into grooves 38 and 40 in box 48 and can be locked therein by lock 52, specifically plunger 54 operated by key 53. Box 48 now covers the face of radio 60, as well as holding hasp 46 locked against gear lever 28.

When it is desired to drive vehicle 20, box 48 and hasp 46 are removed by unlocking lock 52, sliding hasp 46 forward until it will clear knob 30 and move out of grooves 38 and 40, then lifting box 48 with hasp 46 off of plates 14 and 16, thus exposing radio 60 and gear lever 28 for immediate use. In some instances, it may be necessary to entirely remove hasp ends 42 and 44 from box 48 in order to free plates 14 and 16. Box 48 with hasp 46 can be conveniently stored in vehicle 20 for easy reuse. Plates 14, 16, and 64 crossbar 50, box 48 and lock 52 and hasp 46 are preferably of steel or other sturdy tamper-proof metal. Thus, device 10 is compact, simple, durable, inexpensive and highly effective as a dual anti-theft device.

Figure 3:
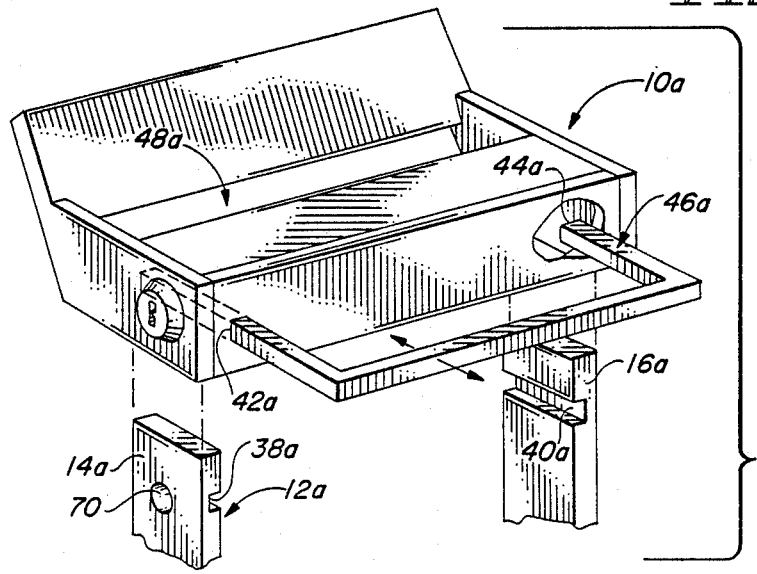
FIG. 3 is a schematic perspective view of the box hasp and upper portion of the frame of a second preferred embodiment of the device of the present invention; and, FIG. 4 is an enlarged schematic front elevation, partly broken away, of the key lock of FIG. 3 in the locked position, locking the hasp to the box and the box to the frame.

FIGS. 3 and 4

A second preferred embodiment of the device of the present invention is schematically depicted in FIGS. 3 and 4. Thus, device 10a is shown. Components thereof similar to those of device 10 bear the same numerals, but are succeeded by the letter "a".

Device 10a is identical to device 10 except in the following respects:

(a) hasp 46a, including ends 42a and 44a is a rod of square cross-section;

(b) grooves 38a and 40a of plates 14a and 16a are of similar cross-section to ends 42a and 44a;

(c) lock 52a, with key 53a, is connected to one side of box 48a and plunger 54a extends through box 48a and an opening 70 in plate 14a into groove 38a and thus into contact with recess 56a in end 42a, so as to releasably lock hasp 46a to box 48a to frame 12a. Device 10a performs similarly to device 10 and has similar advantages. It will be understood that, if desired, hasp 46 and/or 46a can be of steel or other metal flexible cable or the like instead of rigid rod, so long as it slides in the grooves of frame 12 or 12a and can be releasably locked therein by lock 52 or 52a. Moreover, the precise configuration of frame 12, box 48 and hasp 46 can vary, depending on the particular shape, size and location of the vehicle's radio and gear shift lever.

Various other modifications, changes, alterations and additions can also be made in the device of the present invention, its components and parameters. All such changes, modifications, alterations and additions as are within the scope of the appended claims form part of the present invention.

PRIOR ART STATEMENT

A preliminary patentability search was conducted on the subject matter of the present invention. The following U.S. patents were located during the search:

No. 4,028,913 to Falk
No. 4,248,069 to Burbank
No. 4,131,173 to Boersma

All three patents disclose devices which lock car radios to the vehicle structure. Falk discloses an open box frame adapted to be secured to a post in the vehicle. Burbank and Boersma disclose boxes attached to the vehicle dashboard with lids which drop down over the vehicle radio. All three devices are difficult to install, require considerable vehicle structural work and cannot be easily removed. None of these devices are capable of simultaneously protecting the vehicle gear shift against movement, so that the vehicle cannot be stolen and driven away. Accordingly, the present claimed invention is patentable thereover.

What is claimed is:

1. An improved vehicle shift and radio security lock device, said device comprising, in combination:
   (a) an about upright frame adapted to be permanently connected to the interior of a vehicle driver compartment adjacent the vehicle gear shift and radio;
   (b) a lock unit releasably slideably receivable down over the upper end of said frame to a security position, said unit including,
      i. a generally closed box adapted to slideably receive the upper end of said frame, said box being positionable behind a vehicle gear shift and including means extending rearwardly therefrom to block access to a vehicle radio behind said gear shift when said box is on said frame,
      ii. a security hasp to be releasably trained around said gear shift to immobilize said gear shift, the opposite ends of said hasp being releasably secureable in said box, and
      iii. lock means connected to the exterior of said box and extending into said box to releasably lock said hasp in said box and said box to said frame, to immobilize said gear shift and prevent removal of said radio.

2. The improved security lock device of claim 1 wherein said rearwardly extending box means includes a plate connected to the rear of said box and adapted to cover the face of a vehicle radio mounted in the vehicle dashboard.

3. The improved security lock device of claim 1 wherein said hasp is a loop, the opposite ends of which are slideably received in spaced openings in the front of said box, said loop extending forward of said box and moveable between a forward position not engaging a vehicle gear shift and a rearward lockable position engaging a vehicle gear shift, pinning said shift between said loop and box.

4. The improved security lock device of claim 1 wherein said lock means includes a key lock with locking plunger which in the locked position intercepts and locks one of said hasp ends while in said box.

5. The improved security lock device of claim 4 wherein said frame comprises a spaced pair of upright plates, wherein said hasp ends are slideably received in grooves in the portion of said plates which are in said box when said box is in said security position and wherein said locking plunger pins said intercepted hasp end in one of said groove, immobilizing said box and hasp on said frame to protect said radio and gear shift against movement.

6. The improved security lock device of claim 5 wherein said key lock extends down into said box from the upper end thereof.

7. The improved security lock device of claim 5 wherein said key lock extends into said box from one side thereof.

8. The improved security lock device of claim 1 wherein said hasp comprises a generally-shaped bar.

9. The improved security lock device of claim 1 wherein said hasp comprises a loop of steel cable.

10. The improved security lock device of claim 1 wherein said frame comprises a spaced pair of generally vertical plates adapted to be mounted on opposite sides of an auto vehicle console, and a horizontal cross bar connecting the upper portions of said plates and forming a seat for said box.

11. An improved vehicle gear shift and radio security locking device, comprising:
   (a) an upwardly extending frame fixedly secured to the auto body,
   (b) a lock unit adapted to be releasably secured to said frame and including means positioned to prevent easy removal of said radio,
   (c) a gear shift clamping member positioned to prevent movement of a gear shift from a "PARK" position,
   (d) lock means to secure said lock unit to said frame and said gear shift clamping member.

12. The improved vehicle gear shift and radio security locking device set forth in claim 11 wherein said gear shift clamping member is releasably secured to said lock unit.

* * * * *